United States Patent [19]

Weber et al.

[11] Patent Number: 5,305,205
[45] Date of Patent: Apr. 19, 1994

[54] COMPUTER-ASSISTED TRANSCRIPTION APPARATUS

[76] Inventors: Maria L. Weber; Joseph Weber, both of 46 Hyslop Rd., Brookline, Mass. 02146

[21] Appl. No.: 602,004

[22] Filed: Oct. 23, 1990

[51] Int. Cl.⁵ .............................................. C06F 15/38
[52] U.S. Cl. .............................. 364/419.1; 364/419.14
[58] Field of Search .......................... 364/419, 413.01; 434/167; 400/110

[56] References Cited

U.S. PATENT DOCUMENTS

| Re. 32,773 | 10/1988 | Goldwadder et al. | 364/419 |
|---|---|---|---|
| 4,433,392 | 2/1984 | Beaven | 364/900 |
| 4,543,631 | 9/1985 | Kurosu et al. | 364/200 |
| 4,566,065 | 1/1986 | Toth | 364/300 |
| 4,674,065 | 6/1987 | Lange et al. | 364/900 |
| 4,689,743 | 8/1987 | Chiu | 400/110 |
| 4,833,610 | 5/1989 | Zamora et al. | 364/167 |
| 4,868,750 | 9/1990 | Kucera et al. | 364/419 |
| 4,893,238 | 1/1990 | Venema | 364/419 |

*Primary Examiner*—Roy N. Envall, Jr.
*Assistant Examiner*—Frantzy Poinvil
*Attorney, Agent, or Firm*—Lappin & Kusmer

[57] ABSTRACT

A system for entering data to a data processor, such as a word processor. The system stores a set of vocabulary words in a storage device, and may assign frequency data values to each word in the vocabulary. A display list based on the stored reference vocabulary words is generated, and displayed in a ranked order based on the assigned frequency values, in response to the keyboard entry of data, or characters, by the user.

8 Claims, 2 Drawing Sheets

COMPUTER-ASSISTED TRANSCRIPTION APPARATUS

BACKGROUND OF THE DISCLOSURE

The invention is in the field of computer assisted transcription apparatus or word processing systems.

In certain professional fields the need arises for transcription of technical documents containing a highly specialized vocabulary. One field in which such transcriptions are routinely relied upon is in the medical field. Doctors will often dictate notes following patient examinations, which notes must then be transcribed into the patient records. The transcription process is usually performed by trained medical transcriptionists who are familiar with the specialized vocabulary of the particular field of medicine.

Reliance on such specially trained transcriptionists involves extensive training, resulting in long lead-times to high productivity. In addition, mistranscriptions in the often complex, specialized terminology of some fields of medicine may significantly impact the quality of medical care received by a patient. Thus, it is important for the transcriptionist to have access to a medical dictionary to verify spellings. Unfortunately, the use of a dictionary to either manually or electronically retrieve technical words is time consuming, inefficient, and cost-ineffective.

There exists a system with automatic expansion of words as they are entered into the system by a user. The system is known as XyWrite, available from XyQuest, Inc., and includes the feature of having automatic expansion of words. Similar to a macro program in a computer word processing system, the automatic expansion feature of XyWrite enables a user to assign full words to abbreviations for those words. Thus, a user may assign the abbreviation "com" to the word "communication" in a user-defined vocabulary. Any time a user wants to incorporate the word "communication" into the typed text, the abbreviation may be typed instead of the full word. However, this system requires that the user predefine each abbreviation, which may entail hours of set-up time.

Another system for entering full text words by typing abbreviations is called "PRD+", available from Productivity Software International, Inc., New York, N.Y. This product includes a medical transcription edition for using abbreviations for medical terminology used in transcribing medical records, as described above. In that system, there is a one-to-one correlation between a typed abbreviation and a word. As the user types, the system identifies the word corresponding to the abbreviation, or fraction of a word. When the user hits a preselected key, such as the space bar, the complete word is entered in place of the abbreviation. For example, as a user types the word "posterior", the full word will be entered once the user types "pos", followed by a space bar. Alternatively, the user may assign words or phrases to acronyms or abbreviations. For example, the phrase "was admitted to the hospital" may be entered once the user types the abbreviation "wah".

Often it is desirable for a user to be able to select the word to be entered during word processing. In the above example, the abbreviation "pos" may be used to refer to the full word "posterior", or may also be used to refer to the words "positive", "positioning", "postcardiometry", "postmortem", or a variety of terms or phrases. In the prior art systems, the user cannot select which word is to be inserted into the text after a given abbreviation or portion of a word is typed into the text. Other prior art systems may use contextual relationships of words as one criteria for selection of words. These systems do not provide consistent abbreviations, thus slowing down the transcription time.

There remains a need for an improved word processing and transcription system for generating a display list of words and phrases following an initial entry of some or all letters of text by a user for enabling the user to selectively enter a word or phrase from the list into a word processor.

SUMMARY OF THE INVENTION

The present invention is a system for entering data to a data processor, such as a word processor. The word processor includes an alphanumeric keyboard device, a display screen, and a programmed digital computer. The system stores a set of vocabulary words in a storage device, and may assign frequency of use data for each word in the vocabulary.

A list, based on the stored vocabulary words, is generated in response to the keyboard entry of data, or characters, by the user. The generated list may be an ordered list of words, each word having an initial character sequence corresponding to the succession of characters entered by the user. In one embodiment of the invention, the words in the list are ordered in decreasing order of frequency of use or occurrence in a set of documents similar in nature to the document being typed, as determined by the stored frequency data.

Once the list is generated, it is displayed on the display screen, and the user may selectively enter a word from the list to the data or word processor. The system may include a default setting which enables the user to enter the first word, or most frequently used word, from the list by activation of a predetermined key of the keyboard. The system may also enable the user to by-pass the default word, and select any of the words from the generated word list for entry into the word processor by striking a predetermined key.

In addition to the vocabulary words, phrases and/or special abbreviations for words and phrases may be entered into the memory storage device and assigned frequency values. These phrases will then be included in the generated word list for subsequent selective entry into the processor by the user. The system also enables the user to assign frequency values to the words and phrases in the memory storage device, and in this manner the user may alter the ordered listing of words. In addition, the generated list may order the words and phrases based on criteria other than frequency.

Thus, it is an object of the invention to provide an efficient word management system for high-speed text generation.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
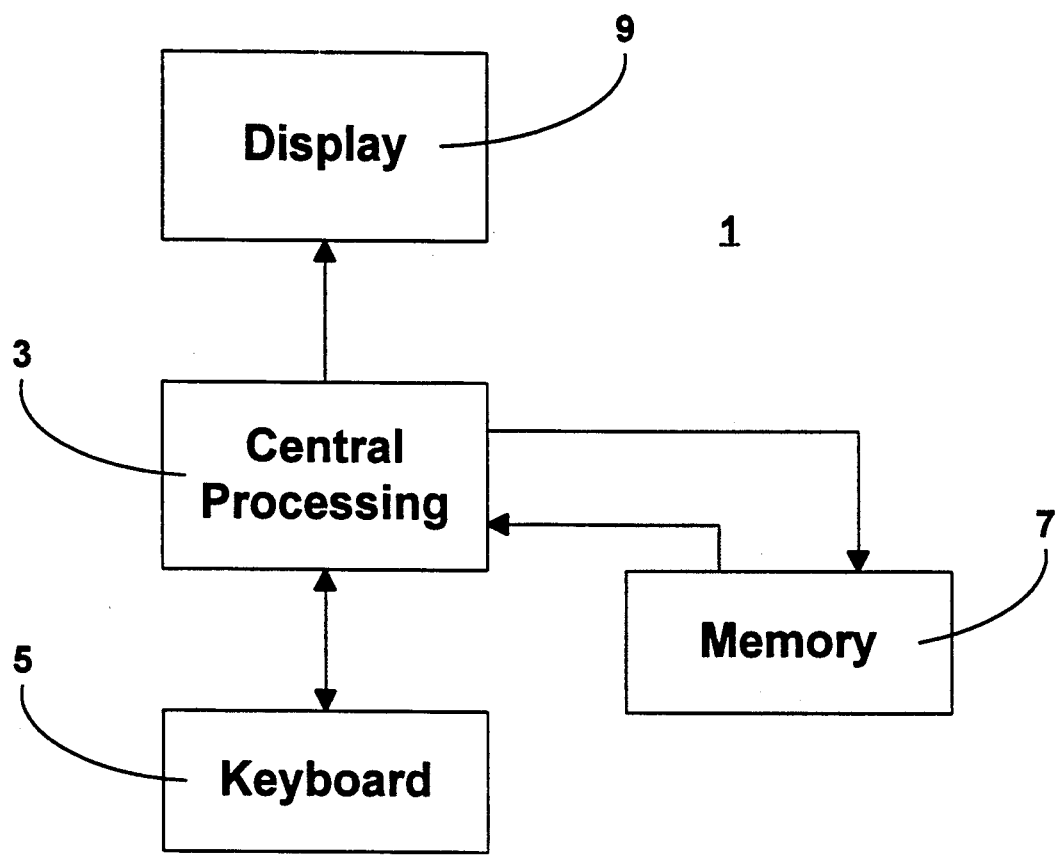
FIG. 1 shows in block diagram form, a preferred embodiment of the invention.

The present invention is a system which combines standard word processing capabilities with a specialized vocabulary of built-in and modifiable words accessible through partial word entry or abbreviations. In the preferred form, shown in FIG. 1, the system 1 is a programmed digital computer, such an Intel 80286 or 80386 based personal computer. The system 1 includes a central processing unit 3 and memory device 7 for storing data representative of a set of vocabulary words, phrases, and associated frequency values. The system 1 also includes a keyboard 5 or other device for entering data or characters for processing. Finally, the system 1 includes a display 9 screen for displaying information to the system user.

Figure 2:
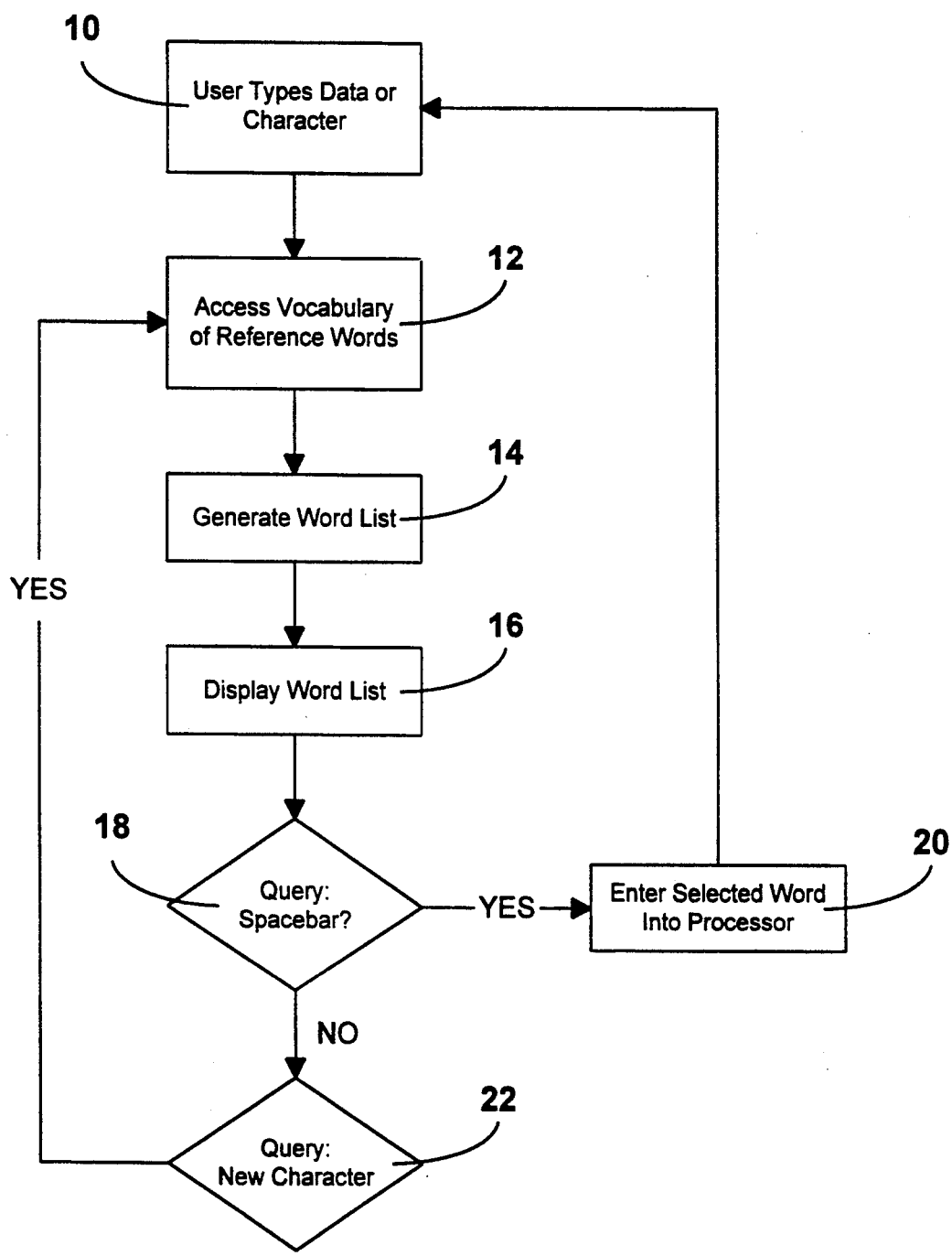
FIG. 2 shows a flow diagram of the system of FIG. 1.

FIG. 2 shows a basic operational flow diagram of the preferred form of the invention. This form enables a user to enter a keystroke (10), representative of a character or datum, which the system then uses to form a query to a predetermined reference vocabulary of words (12). This vocabulary of words may include single words, multiple word phrases, and abbreviations with associated phrases. A word list of possible matching words is generated (14) by the system. The list is then displayed (16) to the user, at which point the user may either strike a predetermined key (18), such as a space bar, to enter a word from the displayed list, or enter another character (22), to begin the cycle again. For each keystroke by the user, a new word list is generated and displayed.

In the preferred embodiment, the system includes an IBM 80386 with a DOS based operating system and a 40MB hard drive. In this form, the user may be a medical transcriptionist, typing from a dictation. By displaying a list of words, the system of the invention not only enables the user to expediently enter long medical text, but also assures that properly spelled words are inserted into the processor. The displayed vocabulary list contains properly spelled words beginning with the letter, or string of letters, typed in by the user.

In the preferred embodiment, the prestored vocabulary includes approximately 12,000 words of a technical vocabulary. For example, words used for transcribing medical text in a radiology department may be used as the predetermined vocabulary. The vocabulary may also include phrases commonly used in the field, which phrases may be assigned specific abbreviations to be defined and entered by a user. The vocabulary may be altered by the user, including changes to the inclusion or exclusion of individual words and phrases or relative frequency values associated with each word or phrase in the reference list.

As the user enters characters one-at-a-time from the keyboard, a display list of words appears in a random or predetermined order and contains words which begin with the letter or letters entered by the user. If the user types a sequence of letters to which no words in the reference vocabulary match, an error message will be sent to the user, such as "no match", and the user may change or correct the spelling of a word before the entire word is completed. For example, if the user intends to type "pneumonia", but begins by typing the characters, "np", unless there is a phrase associated with the characters "np" located in the reference vocabulary, the message "no match" will appear to the user on the display screen. In that example, the user may correct the spelling after typing only two letters, instead of incorrectly spelling the entire word and then retyping the correct word. In this manner, the system of the invention includes a spell checker which checks the spelling as the user types.

In one embodiment of the invention, if the typed characters exactly match a word in the reference vocabulary, that exact match word will appear at the top of the display list. For example, if a user types "an", the indefinite article "an" will appear at the top of the display list of words, even if it is not the most frequently used word from the reference list beginning with the typed characters. Following this exact match word, other words beginning with "an", such as "and", "another", and "analysis" may appear.

When the display list is presented to the user, the first word in the list may be back-lighted or otherwise marked. The user may then enter the back-lighted or marked word in the list by striking a preselected key, (such as the space bar in the illustrated embodiment) or may strike another key associated with a word in the list, or scroll through the display word list to enter a user-selected word. The number of words appearing in the display list may vary, depending on the speed of the underlying computer system and the specific user environment. In the preferred embodiment, the list displays ten words at a time. The user may also scroll through the entire set of words matching the initial typed characters at ten words at a time.

The display list may also be ignored or overridden by the user, and a word typed in full. This may be useful in such instances as entering a name or a rarely used word. The system incorporates knowledge of where capitalized alphabetic characters should appear, and automatically and appropriately inserts the capitalized characters.

In one embodiment of the invention, each word in the stored vocabulary is assigned a frequency value based on the occurrence frequency of the word in a specified context. One method for deriving such frequencies is to analyze a large number of documents using the specialized vocabulary. For example, the frequency associated with words in a radiology-specific vocabulary is derived from an analysis of documents, such as radiology reports, from a radiology department. A frequency value is derived for each word in the vocabulary, and is stored in association with that word in a memory device. The display list then displays the words from the vocabulary in decreasing order based on the associated frequency, with the most frequently used word at the top of the list. Thus, as described above, the user may enter the most frequently used word by striking a predetermined key, such as a space bar.

This word list based on frequency of use may be combined with the previously described feature of having exact match words appearing at the top of the list. Thus, an exact match word will be followed in the display list by the most frequently used word beginning with the user-entered character or characters.

To minimize the number of words in any vocabulary, and thus enhance system performance, the total vocabulary may be segmented by author and/or document type. Standardized vocabularies compiled by worktype can also be utilized. Thus, if a user consistently transcribes dictations for a doctor in the radiology department, the frequencies of each vocabulary word in a customized vocabulary may be tailored to that doctor's usage and segmented by author. Alternatively, or in conjunction with the author segmentation, a radiology vocabulary may differ from a pharmacology or obstetrics vocabulary, thus the vocabulary may be segmented by document type or context.

The vocabulary may be additionally restricted to a set of words within the reference vocabulary. For example, if a user wants to type the name of a drug, but is uncertain as to its spelling, the user can command the system to only display a list of words which begin with the user keystroke(s), and which are drug-related words. Thus, the search of the reference vocabulary following the entered data from the keyboard may be restricted based on the user's knowledge of the domain for the word.

An important aspect of the invention is the display of a consistent list of words in response to an entered character from a keyboard entry device. The entry of keystrokes "ab", for example, should result in the display of the same ten words, appearing in the same order. In this manner, a user will know which exact sequence of keystrokes will result in the entry of the desired word, eventually without having to visually reference the display list between each keystroke. Thus, in one embodiment of the invention, the reference vocabulary may be customized to suit the individual user. The customized vocabulary may also include abbreviations for phrases which are assigned frequency values to appear at a particular position in the display screen by the user.

In one embodiment of the invention, the system is dynamic, continuously adding newly-used words to the reference vocabulary. By continuously adding words to the reference vocabulary, the system may then update the frequency of all or some words on the reference vocabulary on a dynamic basis. The system may then allow automatic or user adjustment of the frequency values associated with each word in the vocabulary.

In the system of the present invention, one particular keystroke is designated as the "entry" keystroke. A return key or a space bar keystroke may be used to indicate to the system that a word entry is to be made to the processor. The use of a "return" or a space bar keystroke is desirable because of their location on most standard keyboards, and because of the nature of their use during normal keyboard operation. The space bar is the preferred keystroke for entry of a word which was either typed in full by a user or selected from the top of a word list. Since in normal typing applications the space bar is used following the completion of every word, the use of the space bar to enter the most frequent word in the system of the present invention facilitates learning the keystroke command and decreases training time.

In addition to having a single entry keystroke, each word in the display list may have an associated entry keystroke. For example, if the fourth word in the list is the desired word to be entered, the user may strike the "3" key on the keyboard to enter that fourth word, where the words in the list are numbered "0" through "9". The use of special, associated entry keystrokes for each word in the display list may include using the same entry keystroke for every word on the display list in conjunction with a scrolling function key, or associating an entry keystroke for each of the ten words in the display list.

Another feature which may be used in conjunction with the display system of the invention is the use of customized abbreviations. The abbreviations may be user-defined, and may represent frequently used phrases or text. For example, a user may assign the abbreviation "noa" to automatically generate the text phrase "no other abnormalities." The system may still generate a list of alternative words from the reference vocabulary which begin with the letters "noa", but the frequency may be customized so that the user-defined phrase will appear at the top of the display list for easy entry by the user.

The invention is not restricted to medical transcription, but can be used in any text generation or word processing application where a document vocabulary is predefined.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A data processor system, said data processor system including an alphanumeric character data entry device and a display screen, and said data being representative of words from a predetermined set of alphanumeric vocabulary words, comprising:
   A. storage means for storing vocabulary data representative of said vocabulary words, and for storing associated frequency data representative of a predetermined frequency of occurrence for each of said vocabulary words,
   B. list means responsive to the entry of a succession of characters by said data entry device on a character by character basis for determining a succession of ordered lists of candidate words from said vocabulary words, each word in said list having an initial character sequence corresponding to the succession of characters entered at said data entry device, wherein said candidate words in said list are ordered in decreasing order of frequency of occurrence as determined by said stored frequency data,
   C. display means for displaying at least a portion of said list on said display screen, and
   D. entry means for selecting one of the candidate words from said list.

2. The system according to claim 1 wherein said data entry means includes a keyboard data entry device, and means for automatically entering the first word in said list for entry into said data processor in response to operator activation of a predetermined key of said keyboard data entry device.

3. The system according to claim 1 wherein said entry means includes an interactive means responsive to an operator action at said data entry device to selectively enter to said data processor one of said words from said list.

4. The system according to claim 1 wherein said predetermined frequency of occurrence for each of said vocabulary words is derived from an empirical analysis of frequency of occurrence of each of said vocabulary words in a predetermined, finite collection of vocabulary words.

5. The system according to claim 1 wherein said predetermined frequency of occurrence for at least some of said vocabulary words is user-determined.

6. The system according to claim 1 wherein said display means includes means for selectively displaying a plurality of predetermined portions of said ordered list of candidate words.

7. The system according to claim 1 further including user controlled means for modifying said predetermined set of vocabulary words.

8. The system according to claim 1 further including means for identifying on a character by character basis occurrences of initial sequences of entered characters which have no corresponding initial sequences in any of said vocabulary words in said predetermined set of vocabulary words.

* * * * *